March 24, 1953  E. H. SCHOEFFLER ET AL  2,632,525
FILTER FOR POWDERS
Filed Nov. 3, 1949
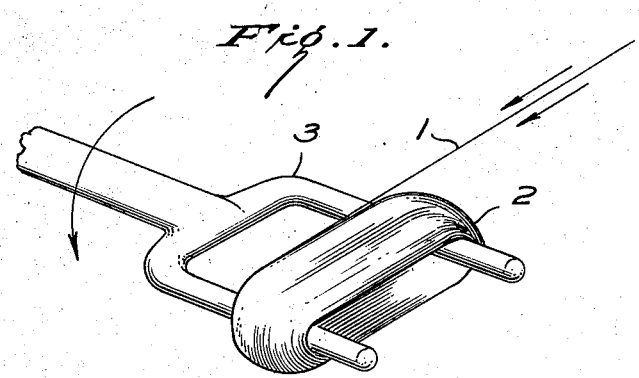
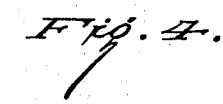
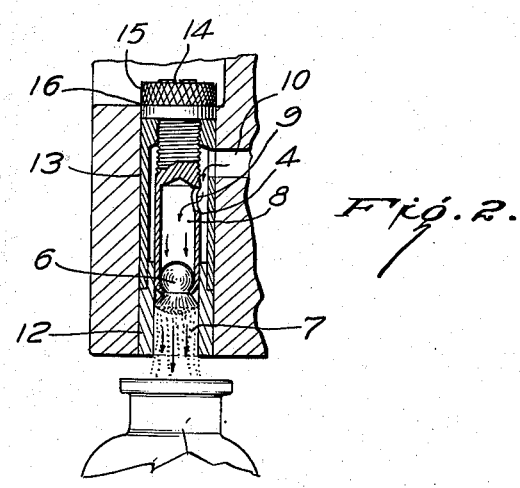
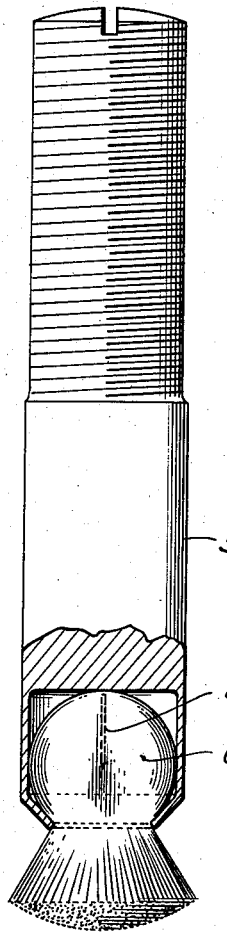
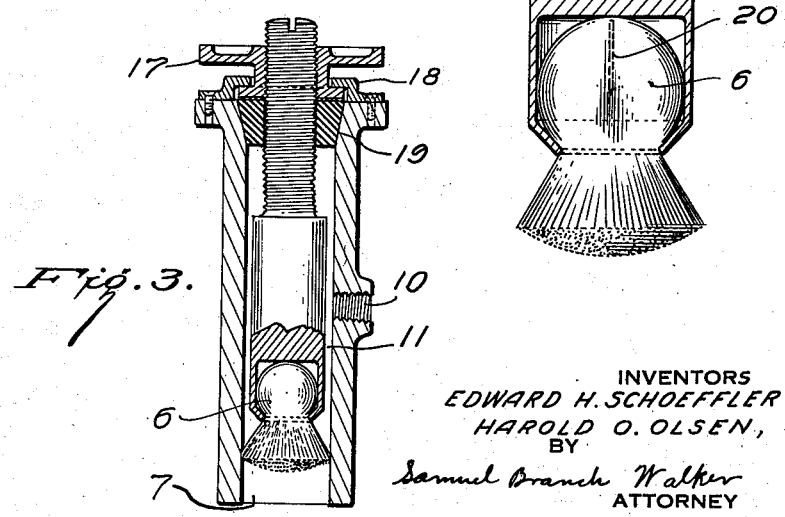
INVENTORS
EDWARD H. SCHOEFFLER,
HAROLD O. OLSEN,
BY
Samuel Branch Walker
ATTORNEY Patented Mar. 24, 1953

2,632,525

UNITED STATES PATENT OFFICE 2,632,525

FILTER FOR POWDERS

Edward Henry Schoeffler, Woodbridge, and Harold Olav Olsen, Fanwood, N. J., assignors to American Cyanamid Company, New York, N. Y., a corporation of Maine Application November 3, 1949, Serial No. 125,348

3 Claims. (Cl. 183—44)

The present invention relates to a filter for a powder measuring chamber for the measuring of powdered particles, or granular products. One end of the chamber consists of a large number of ends of wire, presented substantially endwise to the flow of the powdered contents of the chamber, thereby forming a filter, which permits the gaseous content of the powder to flow through the filter, but restrains the flow of the solid particles, thereby giving a remarkably effective and convenient filter, which is non-clogging and which gives a remarkably uniform and accurate chamber size, so that each time the chamber is filled and its contents are discharged, the same quantity of powder will be retained and discharged thereby.

A machine using such chambers is disclosed in U. S. Patent 2,540,059 to Frank E. Stirn and Arthur S. Taylor, entitled Method of and Apparatus for Measuring and Filling Powders Volumetrically.

In the past, considerable difficulty has been found in the obtaining and maintenance of a suitable filter.

An object of this invention is to provide a filter for a cylindrical measuring chamber, which may be used at one end of the cylindrical measuring chamber, which filter is easily cleaned, and may be readily rendered sterile. For this purpose, it is desired that the filter be of a non-corrosive and heat stable material. We have found, for this purpose, that by using a stainless steel retainer, and a series of wires, which wires may be of nickel, or stainless steel, gold, silver, or other non-corrosive material; presented substantially endwise, there may be formed a filter which is effective in preventing the flow of the powders, is sufficiently porous to permit the air, or other gases, in the powder to flow through it readily; and at the same time, which upon disassembling, frays out so that it may be easily cleaned and sterilized.

For special purposes, the filter member might be composed of nylon, silk, or other fibrous material, or other of the modern plastics, such as polyethylene, etc. But if it is composed of such an organic material, naturally it cannot be submitted to as high a temperature as if it is composed of metals. The composition of the metal is critical only in that it must be non-corrosive under the specific conditions of cleaning and of use; and must be sufficiently resilient that the fibers or wires composing the filter tend to spread out, and thereby completely fill the end of the chamber in which they are placed. It is not necessary that the wires be round, but round wires are found to be much cheaper and satisfactory; nor need the cylinder be round.

Whereas other non-corrosive materials may easily be used, depending upon the conditions of use, we have found that a pure nickel wire, or a stainless steel wire, is sufficiently strong to withstand continued use, and is sufficiently non-corrosive, and resistant to solvents. After the material is cleaned, it may be readily dried without leaving any trace of corrosion or residue; and may be sterilized by the action of either steam, under pressure, or dry heat, or such other treatment as is desired.

Referring to the drawings:

Figure 1 shows a method of preparing a skein of wire for use in the filter brush.

Figure 2 shows a particular embodiment in which the filling and releasing gases are fed axially through the brush filter assembly.

Figure 3 shows a solid brush assembly, in which the gases move around the outside of the brush retainer.

Figure 4 shows in detail a solid brush retainer for use in a measuring chamber, such as that shown in Figure 3.

The construction of our particular filter will probably be best understood by the description of a convenient method of making it, as shown in Figure 1. A small wire 1 is wound around and around a winding fork 3 to form a skein 2. The number of turns will be determined by the size of the wire and the size of the chamber diameter. After a suitable number of turns are taken, the assembled skein may be clamped in the middle of the winding fork 3, and the complete skein 2, comprising the multitudinous turns of wire held while the fork is removed. The skein may then be inserted in the end of a hollow holder, such as shown at 4, in Figure 2, or as shown in Figure 4, in a solid holder 5; and the end thereof turned down or crimped so as to clamp, or hold the skein in position. A retaining end-turn 20 may be used to hold the wires in position while they are being assembled, and it may be left in the retained portion without damaging it. The end-turn is a short piece of the same wire wrapped about an end of the skein after the fork is removed to hold the wire together during assembly. After the end of the holder, either solid or hollow, is turned down until it binds the wires tightly, a similar holder may, if desired, be placed on the other ends of the wires; and then the entire skein, or bundle of wires severed, thereby permitting the assembly of two brush filters at a single operation.

For convenience, the brush filter assembly is normally cut across evenly. The ends of the wires as cut will then fray out so that the diameter of the bundle is markedly larger than the retainer. At this point, the assembly may be tested for tightness, to be sure that none of the wires are loose. If properly assembled, the wires will break before they will pull free. The assembly may then be inserted solid end first into a chamber sleeve 12 to close it off and thus form a measuring chamber 7. By having the opposite end of the holder threaded, it is possible to firmly fasten and position the brush filter assembly 6 in the chamber sleeve 12 to a predetermined depth, or to a variable depth, so that the measuring chamber 7 thus formed has a definite, fixed, although adjustable size.

A filling machine which may use our filter is shown in the Stirn et al., Patent Number 2,540,059. The machine has a filling head turret in which there are a plurality of measuring chambers. The measuring chambers pass under a powder filled hopper from which powder flows into the chamber. The powder is compacted into the chamber by vacuum operating through a foraminous material which forms the end of the chamber, and the powder filled measuring chamber is struck off by means of a doctor blade, and after the filling head rotates to a discharge location, the contents of the measuring chamber are emptied by gas pressure flowing through the foraminous material. Our improved filter for the powder measuring chamber functions as the foraminous material and permits a particularly efficient operation of the measuring machine.

As shown in Figure 2, a measuring cavity 7 is formed from a chamber sleeve 12 which has a cylindrical bore and a brush filter assembly 6 which is positioned in the chamber sleeve thereby forming the measuring cavity.

During the filling portion of the cycle the pressure is reduced in the measuring chamber by withdrawing air through the air passage 10 which in turn communicates with the air passage 9 which in turn communicates with the hollow stem 8. The brush filter assembly 6 is firmly fastened in one end of the hollow stem but is sufficiently porous to permit the flow of air inwardly through the chamber and out through the passages 8, 9 and 10 during the filling portion of the cycle thereby compacting the powder in the chamber and also permit a gas under pressure to flow in a reverse direction through the same passages to cause the ejection of the charge at the desired time.

In the modification shown in Figure 3, a solid retainer is used which is slightly smaller than the chamber sleeve 12 so that air is permitted to flow in and out through the annular space 11 around the solid stem. A detail of this is shown in Figure 4.

There are shown two convenient methods of assembly, wherein the brush filter assembly may be axially adjusted. The one shown in Figure 2 comprises a chamber sleeve 12, in which the brush assembly fits, and above that, a threaded insert 13 in which the threaded end of the brush filter assembly may be turned by means of a slot 14, and which assembly may be kept from turning, after initial adjustment, by means of a lock nut 15 and washer 16.

An alternative method is shown in Figure 3, wherein a solid retainer is shown, and the air passages, or gas passages, are formed by the annular space 11. The upper end of the solid retainer is threaded, and held in position by means of an adjusting nut 17, which adjusting nut is in turn held in position by an adjusting nut retainer 18 which may be fastened to the main body. A tapered washer 19 may be used to insure that an air-tight seal is formed.

In use, the ends of the brush assembly are sufficiently frayed, or spread out, by the natural bend in the wire, or by actually being spread by manual contact, that when placed in the measuring chamber, a powder-tight seal is formed around the external edges thereof. The brush being firmly held in position by the retaining means, as illustrated, forms an end for the measuring chamber, which has a very definite and certain size. Thereby, if the measuring chamber be held in contact with a powder and vacuum applied, there is compacted into this chamber a certain amount of powder; and by striking it off level with the surface thereof, there is insured a uniform quantity of powder each time the chamber is filled; and by the introduction of a gas pressure, as above described, at a desired time, the contents may be discharged.

With our filter brush assembly, it is practically impossible for powder to escape past the brush, and it is equally impossible for particles of the brush to be discharged with the powder contents, under any reasonable conditions of use.

After a run has been completed, and the device disassembled, the ends of the brush spread from their spring action, thereby releasing any bridges of powder which may have fortuitously been formed therein, rendering the device practically self-cleaning.

A series of these brushes may be used in a series of measuring chambers, or may otherwise be utilized, as may be desired by the user. The exact number of strands and the size will vary with particular operating conditions; but, as representative, for a chamber diameter of $\frac{3}{16}''$, it has been found that if pure nickel wire between .001 and .0013 diameter be used, approximately 8,000 strands will form a filter which will hold any of the common pharmaceutical powders. For a $\frac{1}{4}''$ diameter chamber, 11,000 ends are satisfactory; for an $\frac{11}{32}''$ diameter chamber, 15,000 ends; and for a $\frac{23}{64}''$ diameter chamber, 32,000 ends. Of course, the number of ends will vary with the diameter of the wire, and may be varied, depending upon the exact powder to be used. A coarser powder will permit the use of a fewer number of wires than will a fine powder. Similarly, a somewhat crimped wire, as may be formed by unwinding one strand of a larger wire, gives an assembly in which fewer wires are required.

Having thus described certain aspects thereof, as our invention we claim:

1. A filter for a powder measuring chamber in a volumetric powder measuring machine which chamber is formed by a substantially smooth cylindrical sleeve chamber and the filter comprising a plurality of U-shaped wires uniformly and compactly assembled, the free ends of the wires lying in a smooth surface and tending to spread when free from restraint to a diameter greater than the chamber sleeve in which the filter is used, and a hollow stem, one end of which is crimped about the bent portions of said plurality of U-shaped wires, thereby firmly retaining said wires in said stem, and an air passage in the side of said hollow stem, thereby permitting gaseous flow through the said plurality of wires, and positioning means on said stem.

2. A filter for a powder measuring chamber in a volumetric powder measuring machine which chamber is formed by a substantially smooth cylindrical sleeve chamber and the filter comprising a plurality of U-shaped wires uniformly and compactly assembled, the free end of the wires lying in a smooth surface and tending to spread when free from restraint to a diameter greater than the chamber sleeve in which the filter is used, and a retaining stem having at one end a hollow portion at least deep enough to receive therein the bent portions of said plurality of U-shaped wires, the end of said hollow portion being crimped about the bent portion, thereby firmly retaining said wires in said stem, and positioning means on said stem.

3. A filter for a powder measuring chamber in a volumetric powder measuring machine which chamber is formed by a substantially smooth cylindrical sleeve chamber and the filter comprising a plurality of U-shaped wires uniformly and compactly assembled, the free ends of the wires lying in a smooth surface and tending to spread when free from restraint to a diameter greater than the chamber sleeve in which the filter is used, and a retaining stem, smaller than said chamber sleeve, a hollow recess in the end of said stem containing the bent portions of said plurality of wires and crimped firmly about said portion, thereby retaining said wires in said stem, and positioning means on said stem.

EDWARD HENRY SCHOEFFLER.
HAROLD OLAV OLSEN.

REFERENCES CITED

The following references are of record in the file of this patent:

UNITED STATES PATENTS

| Number | Name | Date |
|---|---|---|
| 1,885,762 | Polushkin | Nov. 1, 1932 |
| 2,328,302 | Simison | Aug. 31, 1943 |
| 2,407,484 | Ehrhardt | Sept. 10, 1946 |
| 2,540,059 | Stirn et al. | Jan. 30, 1951 |

FOREIGN PATENTS

| Number | Country | Date |
|---|---|---|
| 14,186 | Switzerland | Feb. 19, 1897 |
| 684,875 | France | July 2, 1930 |